US008412557B1

(12) United States Patent
Lloyd et al.

(10) Patent No.: US 8,412,557 B1
(45) Date of Patent: Apr. 2, 2013

(54) METHOD AND SYSTEM FOR DETERMINING WHETHER AN OFFERING IS CONTROVERSIAL BASED ON USER FEEDBACK

(75) Inventors: Daniel B. Lloyd, Mercer Island, WA (US); Llewellyn J. Mason, Seattle, WA (US); Ron Kohavi, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 2808 days.

(21) Appl. No.: 11/155,310

(22) Filed: Jun. 17, 2005

(51) Int. Cl.
 *G06F 9/44* (2006.01)
(52) U.S. Cl. .................. 705/7.29; 705/7.31; 705/7.32
(58) Field of Classification Search ............. 705/7.29, 705/7.31, 7.32
 See application file for complete search history.

(56) References Cited

U.S. PATENT DOCUMENTS

| | | | | |
|---|---|---|---|---|
| 6,029,195 | A * | 2/2000 | Herz ..................... | 707/999.01 |
| 7,428,505 | B1 * | 9/2008 | Levy et al. ............. | 705/37 |
| 8,086,484 | B1 * | 12/2011 | Gibson .................. | 705/7.41 |
| 2001/0013009 | A1 * | 8/2001 | Greening et al. ...... | 705/10 |
| 2003/0055723 | A1 * | 3/2003 | English ................. | 705/14 |
| 2005/0192958 | A1 * | 9/2005 | Widjojo et al. ........ | 707/5 |
| 2005/0261919 | A1 * | 11/2005 | Kundtz et al. .......... | 705/1 |
| 2006/0095331 | A1 * | 5/2006 | O'Malley et al. ...... | 705/22 |
| 2006/0253316 | A1 * | 11/2006 | Blackshaw et al. .... | 705/10 |
| 2007/0271246 | A1 * | 11/2007 | Repasi et al. .......... | 707/3 |
| 2008/0059215 | A1 * | 3/2008 | Boyd ...................... | 705/1 |
| 2008/0294501 | A1 * | 11/2008 | Rennich ................. | 705/10 |

FOREIGN PATENT DOCUMENTS

WO 0219203 A2 3/2002

OTHER PUBLICATIONS

"Strategic Implications of Online Word of Mouth", by Xinxin Li, Operations and Information Management, University of Pennsylvania, 2005.*
Borders, William; "Murdoch Arouses Controversy with Offer to Buy the Times of London", New York Times, Jan. 21, 1981.*
Nemetz, Patricia; "Entrepreseurs' Use of Controversial Political Messages—The Effect on Potential Patrons", Journal of Business and Entrepreneurship; Mar. 2005; 17, 1; ProQuest Central.*
Knapp, S., "Dartmouth Researcher Mines Amazon.com to Measure Literary Tastes," Dartmouth News, Jan. 10, 2005,<http://www.dartmouth.edu/~news/releases/2005/01/10.html> [retrieved Feb. 9, 2005].
Lûbin, G., "Gronas Probes Public Lit. Taste in Amazon Reviews," The Dartmouth Online: News, Jan. 12, 2005, <http://www.thedartmouth.com/article.php?aid=2005011201030> [retrieved Feb. 9, 2005].
McCahill, T., "Amazon's Reader Reviews Offer New Insights Into Readers' Tastes, Thoughts," Seattle Post-Intelligencer, Feb. 8, 2005, <http://seattlepi.nwsource.com/business/211086_amazon08.html> [retrieved May 7, 2007].
Miller, L., "Amazon's Ratings Count After All," The New York Times (nytimes.com), Jan. 24, 2005, <http://www.nytimes.com/2005/01/24/technology/24amazon.html... > [retrieved May 8, 2007].

* cited by examiner

*Primary Examiner* — Lynda Jasmin
*Assistant Examiner* — Pan Choy
(74) *Attorney, Agent, or Firm* — Thomas | Horstemeyer, LLP

(57) ABSTRACT

The controversiality of an offering in a computer implemented system is computed based on user satisfaction feedback. A controversiality index can be provided to indicate the extent to which the offering is controversial.

26 Claims, 8 Drawing Sheets

```
Stat.java:

⎡public static int ratingControversial( int[] sampleA, int sample_size )
        ⎢{
   350 ⎨     if( sample_size <= 1 )
        ⎢         return 0;
        ⎣
            // sigma = Standard Deviation
            double sigma = sigma( sampleA, sample_size );

⎡    // Adjust for confidence and convert to an integer score.
   356 ⎨    return (int)(10000*sigma*(1 - (1/Math.sqrt(sample_size))));
        ⎣}

⎡public static double sigma( int[] a, int a_size )
        ⎢{
        ⎢    double mean = mean( a, a_size );
        ⎢    double var = 0;
        ⎢
   354 ⎨    for( int i=0; i<a_size; ++i )
        ⎢    {
        ⎢        double diff = a[i] - mean;
        ⎢        var += diff*diff;
        ⎢    }
        ⎣
            return Math.sqrt( var/a_size );
        }

⎡public static double mean( int[] a, int a_size )
        ⎢{
        ⎢    long total = 0;
   352 ⎨    for( int i=0; i<a_size; ++i )
        ⎢        total += a[i];
        ⎣
            return ((double)total)/a_size;
        }
```

*Fig. 7.*

METHOD AND SYSTEM FOR DETERMINING WHETHER AN OFFERING IS CONTROVERSIAL BASED ON USER FEEDBACK

FIELD OF THE INVENTION

The present invention relates to electronic information processing, particularly electronic commerce, and to information provided to and collected from consumers to assist consumers and merchants (including product, service, and content suppliers) in identifying provocative or controversial offerings.

BACKGROUND OF THE INVENTION

Web sites of online merchants provide many types of information for assisting users in evaluating the merchants' offerings. Similarly, information commonly is collected from users to assist in generating recommendations and to assist the merchants in determining an appropriate selection and inventory. Without limiting the generality of the foregoing, such information can include: textual reviews; scaled ratings; personalized recommendations based on collaborative filtering (which may operate by identifying other users with similar tastes); content based filtered data (which relies on product descriptions to identify products similar to those purchased or highly rated by the user); various combinations of collaborative and content filtered data; and ratings based on or adjusted by age, gender, membership in "communities" selected by or identified for a user, wish lists, geographical location, educational background, occupation, annual income, and, so on. The information is helpful to users which may otherwise may not be familiar with an offering of a merchant. The information can also be valuable to a merchant for suggesting and stocking a particular offering. Sophisticated systems infer personal preference based on proprietary algorithms, whereas less sophisticated systems supply only objective information such as sales and ratings rankings, but large online merchants use, collect and provide information pertaining to both systems.

Still, there are categories of offerings for which traditional information is inaccurate or misleading, and yet which may be useful to a consumer or merchant (including content suppliers).

SUMMARY OF THE INVENTION

The present invention provides a system for determining the extent to which an electronic merchant's offering is provocative or controversial. The offering could be a product, service, or electronic content (articles, music, visual works, and so on). In one embodiment, scaled customer feedback data and sales volume data are stored and evaluated to determine whether or not an offering produces both positive (favorable) and negative (unfavorable) responses from consumers. In some conventional systems, such responses would result in an overall "average" rating, thereby denying the consumer and merchant of interesting or valuable information on the controversiality of the offering. Often controversial offerings sell well, particularly when promoted appropriately. Other times controversial offerings may have an adverse impact on sales, at least for some users, and in that instance the measure of controversiality can be used to filter the offerings to be displayed or accessed.

In accordance with the present invention, different algorithms can be used to measure the extent to which the offering is provocative or controversial. In a representative embodiment, individual consumer satisfaction is expressed in a predetermined numerical rating scale (say 1 to 5 for most negative to most positive). The standard deviation of the ratings can be calculated and used as a measure of controversiality. Offerings with higher numbers of ratings are considered to have a more reliable indication of controversiality and the standard deviation is weighted or adjusted based on the ratings volume. Other weighting factors can be used to express the resulting "controversiality index" in more easy to understand terms. Consumers may be presented with or request information on the index for a desired offering, and merchants may use the index in determining offerings to stock and inventory. Lists of offerings can be generated based on the extent to which the offerings are controversial. Another possibility is to adjust the offerings based on controversiality, such as by deleting controversial offerings, or warning a consumer prior to access.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a representation of software code for a fourth embodiment of the invention.

DETAILED DESCRIPTION OF THE PREFERRED EMBODIMENT

The present invention allows online merchants or others to collect or review and, if desired, display information pertaining to the extent that an online offering is provocative or controversial. While described below with reference to electronic commerce, an offering could be a service or, for example, online content, such as text (articles, reviews, etc.), audible content (such as music), visual material, or some combination of these.

Figure 1:
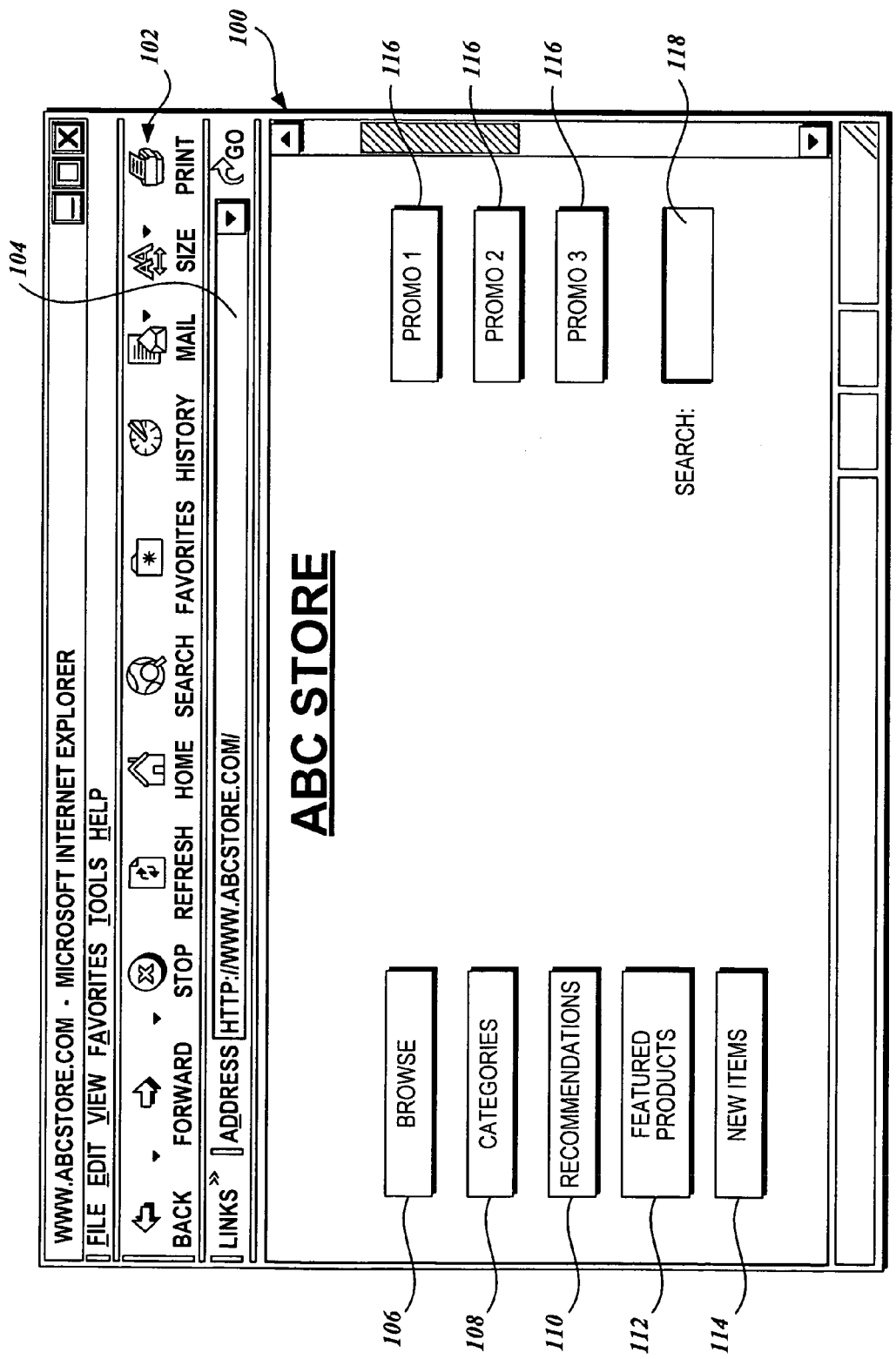
FIG. 1 is a diagram of a Web browser display for electronic commerce with a fictional online merchant, representing common features presented early in the shopping process.

With reference to FIG. 1, a representative Internet browser display 100 has the usual navigation toolbar 102 and URL address window 104. Early in the shopping process, the prospective online customer may be presented with links to more specific areas of the merchant's site. In the illustrated example, the merchant is the fictional company "ABC Store." FIG. 1 illustrates selections for the following: "browse" 106, which can scroll to the beginning of a catalog, or to the table of contents, an index, displays of offerings, etc.; "categories" 108, which may lead to related types of offerings or departments; "recommendations" 110, which may feature offerings based on the user profile or history; "featured products" 112, which may direct the user to sales and specials; and "new items" 114, which may lead the user to offerings recently introduced. The same page may have one or more spaces 116 for promotions or advertisements, with or without links, and a search box 118 for entry of text for ease in navigating the merchant's site. The links on the page can be few or numerous, and can be customized based on the offerings for the site. For example, a news site or music download site may have some of the same general types of links, but modified for ease in navigation or to emphasize different aspects of the offerings.

Figure 2:
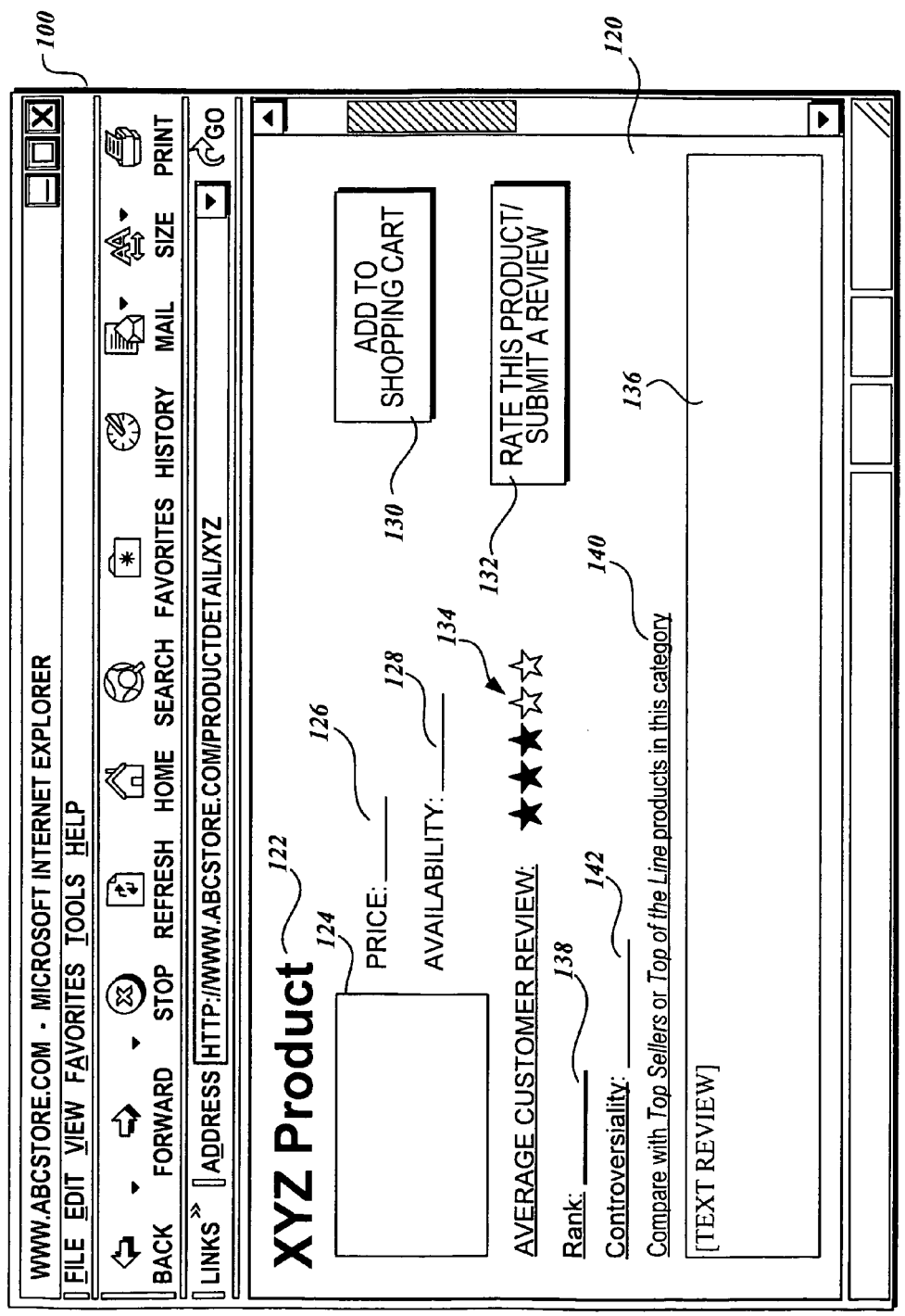
FIG. 2 is a diagram corresponding to FIG. 1 but showing a display farther on in the shopping process, i.e., a display pertaining to a specific offering.

At some point a serious shopper (consumer) will typically reach a page with detailed offering information. As represented in FIG. 2, this page may be devoted to a single offering, in this example identified on the detail page 120 as "XYZ product" at 122. A prominent space 124 can be provided for the offering description and/or photograph, and spaces 126 and 128 for the price and availability (e.g., "in stock"). A button 130 can be used to proceed with ordering the product. Button 132 can link to a page for rating the offering and/or submitting a textual review. In a representative embodiment, the rating is on a scale of 1 to 5 from most negative to most positive, and the average rating can be indicated on the page at 134 such as by stars, other icons, or a number. One or more textual reviews or additional description can be presented to the user in a box 136. Other information of interest can be presented to indicate the popularity of the offering to the user, such as the rank of the offering within a selected category at a space 138. For example, the ranking can indicate the popularity based on total sales as compared to all items within that category. For a book this could be presented as 325/10,000, if 10,000 titles are carried and the offering is the 325th best seller. For a news site, at some point the most popular articles may be listed. Another link 140 can lead to additional information of interest such as a comparison of the "XYZ" offering with top selling offerings from the same category or top rated offerings from that category. The category can be general ("books," for example) or more specific (e.g., "mysteries").

In accordance with the present invention, the online system determines and can display the extent to which an offering is provocative or controversial, such as in the space 142 labeled "controversiality." The indication can be general, such as "high" or "average" or "low," but preferably is more specific such as a numerical ranking on a scale of considerable detail as described below.

Figure 3:
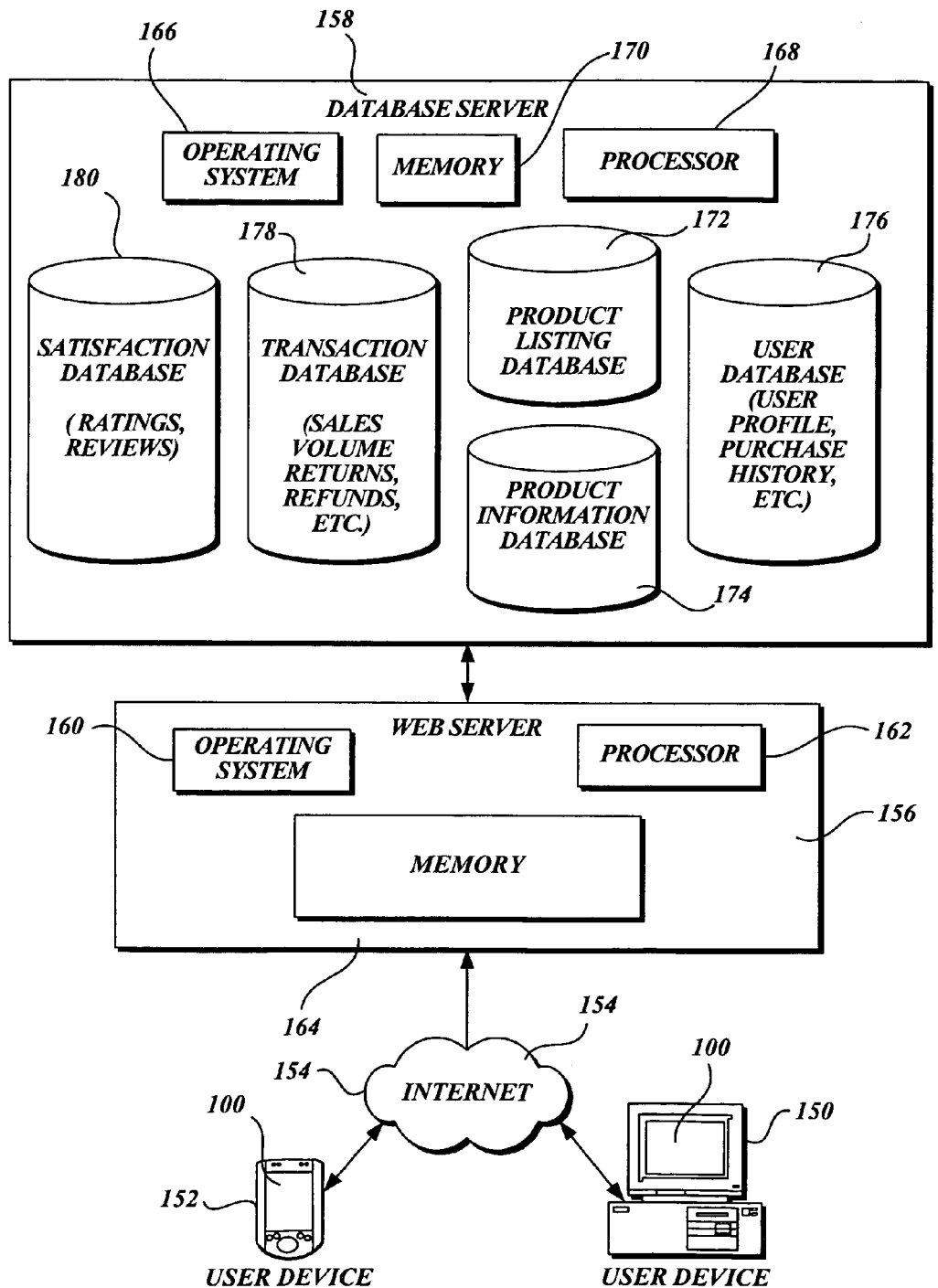
FIG. 3 is a diagram of aspects of an environment in which the present invention may be implemented.

A representative environment in which the present invention is used is represented in FIG. 3. The user display 100 is incorporated in any of a variety of user devices of which a desktop computer 150 and personal digital assistant (PDA) 152 are represented in the figure. Other user devices (laptops, palmtops, etc.) capable of displaying information from and communicating information to the merchant's site over a network can be used. In the illustrated embodiment, the network is the Internet 154 which provides access to a Web server 156 associated with the merchant's database server 158. Web server 156 includes at least an operating system 160, processor 162, and memory 164. Database server 158 includes at least an operating system 166, processor 168 and memory 170. The memory may take the form of computer RAM and/or portable memory devices or components. Several representative components of the merchant's database server are represented separately in FIG. 3 for ease of description of the invention. These include a product listing database 172 and corresponding product information database 174 by means of which detailed information pertaining to a specific offering may be accessed by a user. This information may be updated but at any given moment typically is static. Similarly, a user database 176 can contain information pertaining to the particular user (age, gender, communities, wish lists, and so on) as well as purchase history information which may be used in an algorithm to make product recommendations. A transaction database 178 stores transaction information for the specific offering, which can include sales volume (or access or download volume), returns (gross number or as a percentage of sales, for example), refunds, and so on. Usually the transaction database records the transaction information by date so that trends may be recognized. Finally, the merchant's database server includes a satisfaction database 180 where customer feedback information resides, such as ratings and reviews. Any information or action that indicates a user's reaction, or from which it can be inferred, can be used.

Although the databases 172-180 are indicated as separate areas, most often they will interact, depending on the sophistication of the merchant's system. For example, the merchant may call up transaction information for specific items based on aspects of user profile, in addition to trends established over a period of time. Similarly, historical ratings may be associated with transaction volume for the same period. Thus, the merchant may recognize and, if desired, display to consumers offerings that are trending upward in transactions or upward or downward in customer satisfaction. Information on customer ratings and reviews, and sales volume and returns, and user profiles and purchase histories, is interesting and important, but up to now has not identified offerings that are particularly provocative or controversial. An example is the book Unfit for Command by "The Swift Boat Veterans." Approximately 10,000 ratings during a period close to the 2004 presidential election contained thousands of the highest ratings (5), thousands of the lowest (1), and only a few hundred in between. The average rating was close to "neutral" despite the fact that very few consumers would have agreed with that rating! It is recognized that "provocative" and "controversial" are subject- to differing interpretations, and the present invention contemplates different ways in which an indication of controversiality can be determined and conveyed to a user or the merchant. Regardless of the algorithm chosen, the object is to identify offerings that have invoked passion at both ends of a scale from negative to positive. This can be expressed in other ways, such as unfavorable-favorable, disliked-liked, unsatisfied-satisfied, and so on. For the purposes of this disclosure, the sentiments are expressed as negative-positive.

EXAMPLE 1

Provocative or controversial offerings can be determined by those offerings having both high transaction volumes and a large number of negative consumer feedback, such as negative ratings or reviews. High sales volume can be determined in the aggregate, i.e., volume in excess of a predetermined volume, or proportionally, i.e., above a predetermined percentage of total sales or sales within a given category. Similarly, a large number of negative ratings or reviews can be determined by the aggregate number or by a percentage based on total sales. Since reviews often are the result of more passion than a simple rating, reviews may be weighted more heavily than ratings. Comparison of rating/review and transaction volume information for many offerings will identify those having a larger number or higher percentage of negative ratings or reviews for a given sales volume. Thus, transactions, ratings and/or reviews may be evaluated for a large number of offerings, to determine those having high volume (such as the top 10% or 25% within a category) with higher than average negative ratings or reviews (or above some predetermined proportion of aggregate sales). The ratio of negative ratings to sales volume can be used to create a "controversiality" ranking or "index."

Figure 4:
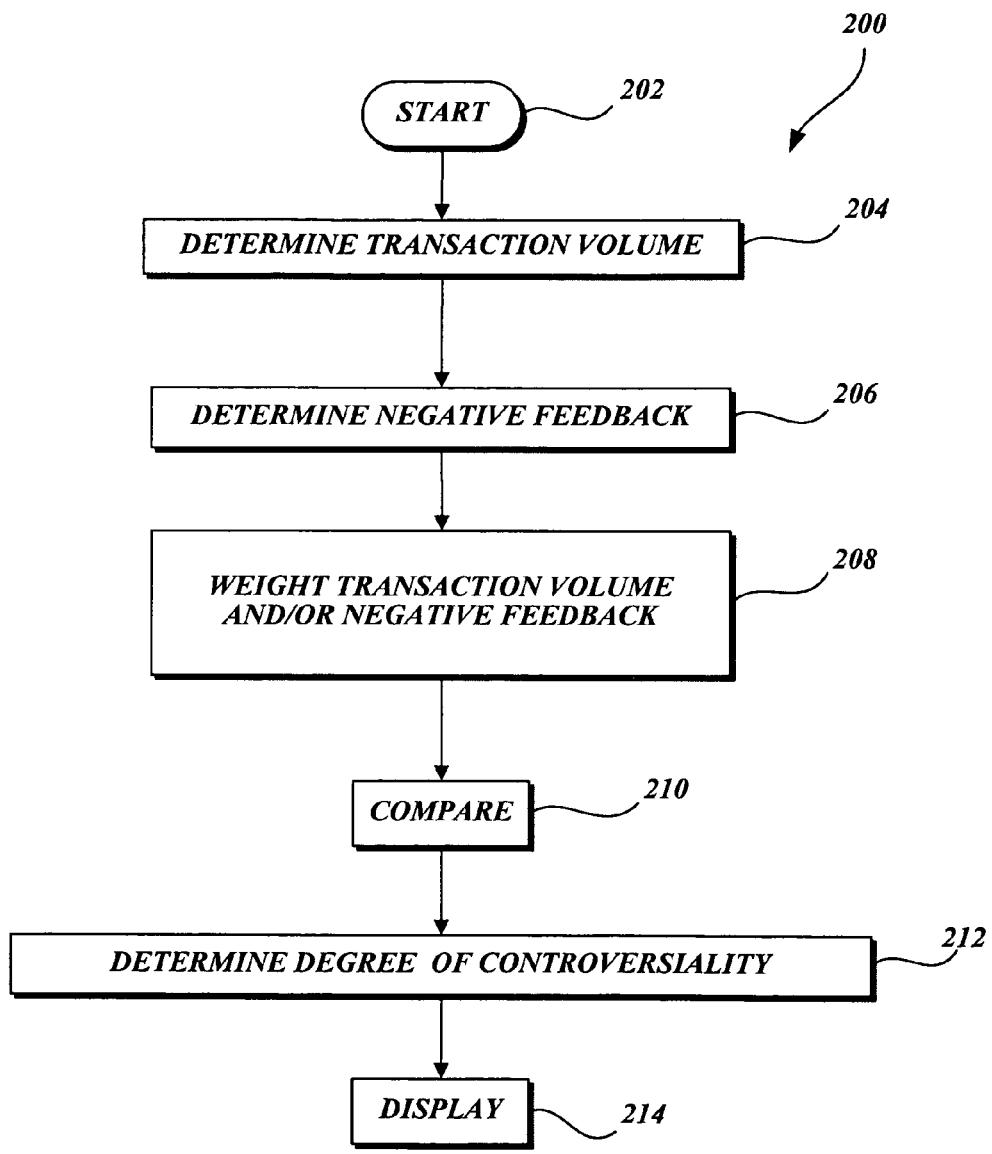
FIG. 4 is a flow chart of steps performed in a first embodiment of the present invention.

With reference to FIG. 4, a representative embodiment of this example can be illustrated as a simple flow chart 200. Once it is determined that the controversiality is to be determined ("start" box 202) a measure of transaction volume is determined as indicated at 204 and a measure of negative feedback is determined as indicated at 206. The measure of transaction volume and negative feedback can be weighted as indicated at 208, and the data from 204, 206 or the weighted data from 208 are compared as indicated at 210. As indicated at 212, the degree of controversiality for the particular offering is determined and, if desired, displayed (214) to the shopper or merchant.

EXAMPLE 2

Products having a large amount of negative feedback; such as large numbers of negative ratings, can be determined as described above, but compared with offerings that otherwise have a relatively high average positive feedback, such as an average rating above a predetermined rating.

Figure 5:
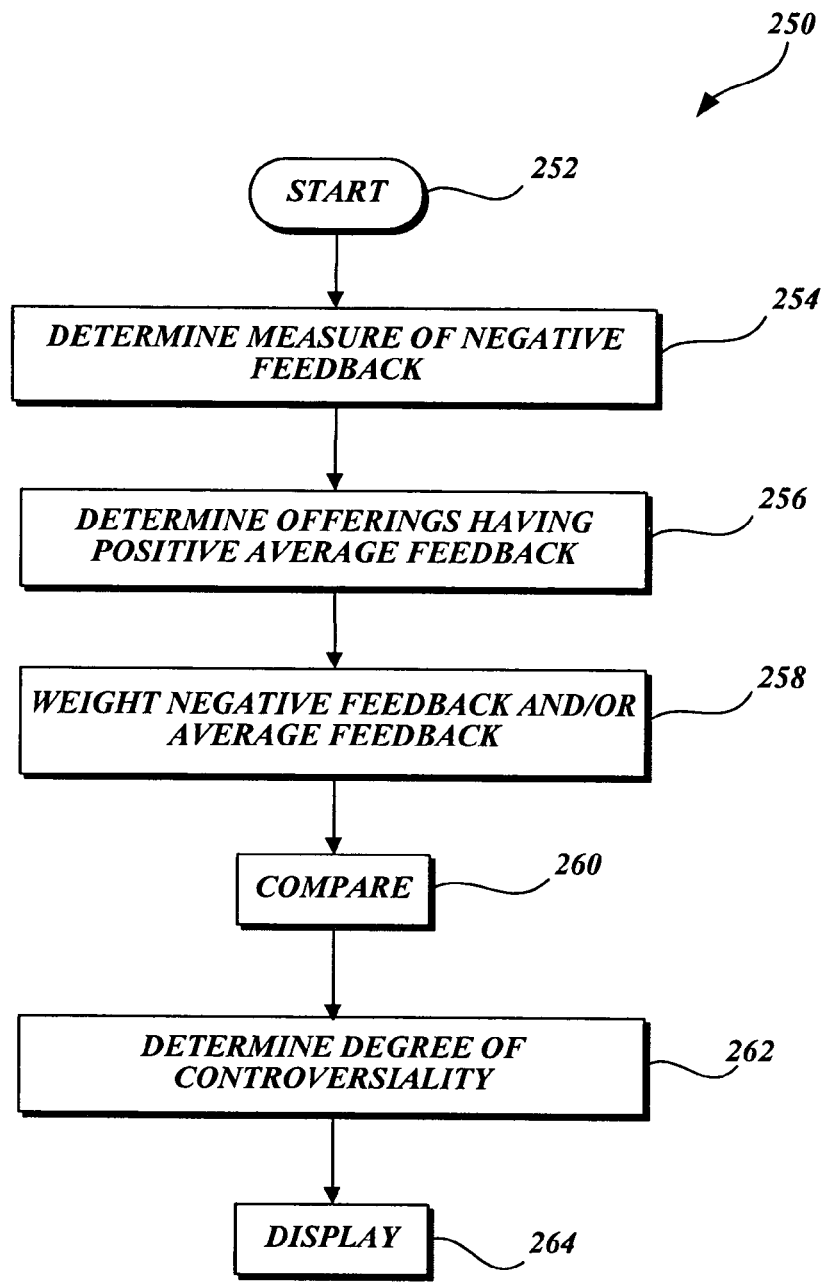
FIG. 5 is a flow chart of steps performed in a second embodiment of the present invention.

Referring to FIG. 5, flow chart 250, once it is determined that controversiality is to be determined ("start" 252), a measure of negative feedback is determined, as indicated at 254; and, as indicated at 256, offerings having a relatively high average rating are identified. The measure of negative feedback can be weighted as indicated at 258. The measure of negative ratings/reviews is compared with the identification of offerings having positive average ratings (260), and the comparison used to determine the degree of controversiality (262). If desired, the degree of controversiality is displayed (264) to the consumer or merchant (content provider).

EXAMPLE 3

Conversely, offerings may be identified having an average or weighted rating below a predetermined rating, but a larger than normal proportion of favorable ratings.

Figure 6:
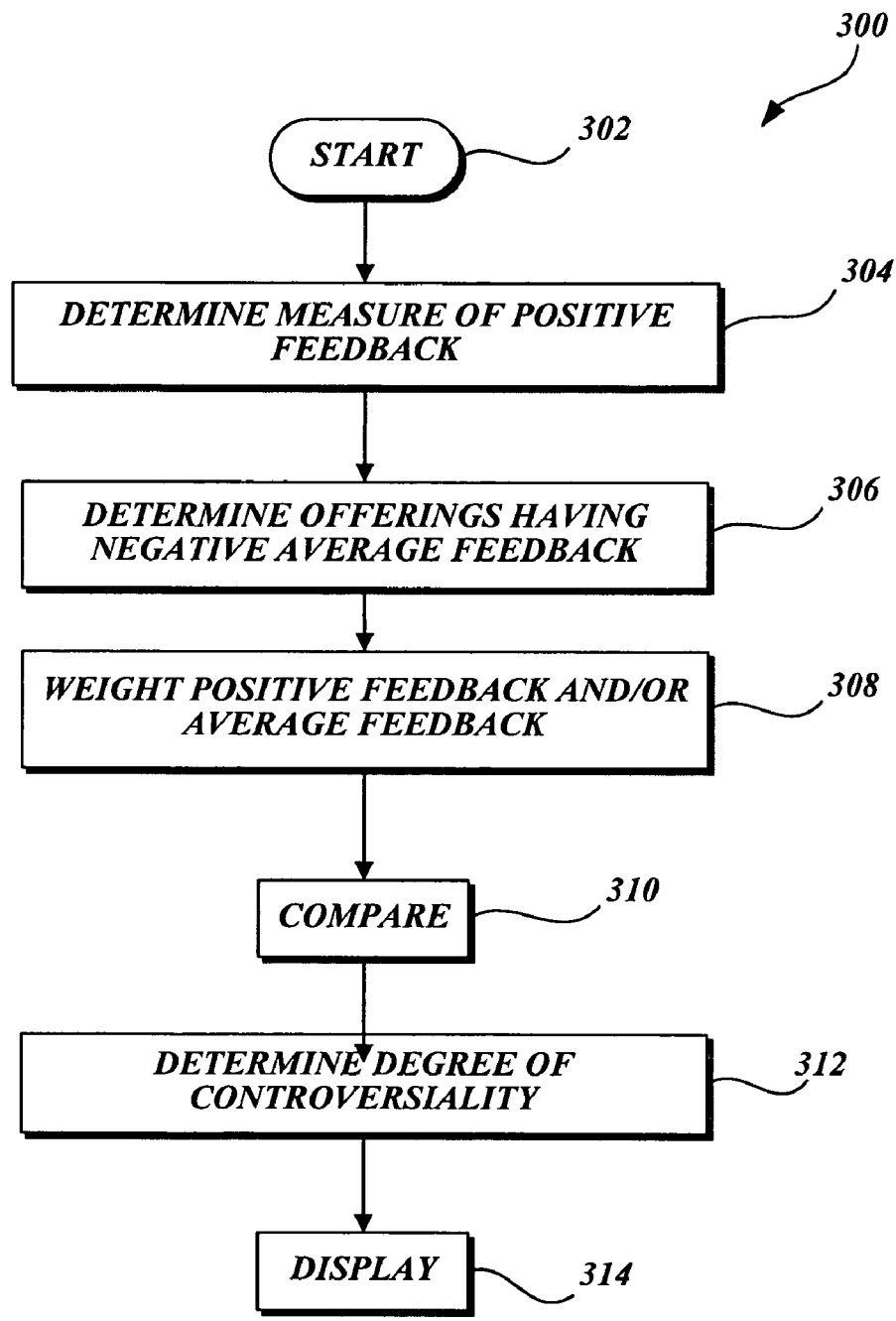
FIG. 6 is a flow chart of steps performed in a third embodiment of the present invention.

Referring to FIG. 6, flow chart 300, once it is determined that controversiality is to be determined ("start" 302), a measure of positive feedback is determined, as indicated at 304; and, as indicated at 306, offerings having a relatively low average rating are identified. The measure of positive feedback or average feedback can be weighted as indicated at 308. The measure of positive feedback is compared with the identification of offerings having negative average ratings (310), and the comparison used to determine the degree of controversiality (312). If desired, the degree of controversiality is displayed (314) to the consumer or merchant (content provider).

In each of the examples given above, accommodation may be made for total sales volume. If volume is below a predetermined amount, it is less likely that the offering really is provocative or controversial to the public at large. Nevertheless, evaluation based on individual profile characteristics may identify controversial or provocative offerings for users having those characteristics. Thus, at the "compare" step, a "confidence factor" may be used to adjust the degree of controversiality, such factor being based on transaction volume. A representative confidence factor is given below with reference to Example 4.

EXAMPLE 4

In the case where the rating system pertains to or can be easily converted to a numerical rating, such as the one star to five star system representing, respectively, very negative, somewhat negative, neutral, somewhat positive, very positive, a mathematical algorithm can be used. More specifically, the standard deviation can be calculated and used in determining the degree of controversiality. This provides a real and reliable indication of those offerings truly controversial, namely, those having a large amount of both positive and negative feedback, such as high numbers of both positive and negative reviews, and low numbers of "neutral" or "somewhat positive/negative" reviews. A mathematical algorithm also has the advantage of being quickly and easily executed in a computer for a large number of offerings, which then can be expressed and ranked by a "controversiality index."

For a scale of 1 to 5, the maximum standard deviation would be 2, representing equal numbers of "1" and "5" ratings with no ratings of "2" or "3" or "4." The calculation can be carried to several decimal places and the result multiplied by a constant so that the result is presented as an integer rather than a fraction. For example, the standard deviation can be calculated to 4 or 5 decimal places and multiplied by 10,000, resulting in a scale of 0 to 20,000, which may appear to have more meaning to a user than a small fraction.

In this system, preferably the "confidence factor" is used based on transaction volume. As mentioned above, it is believed that the reliability of a controversiality index in representing the public at large is greater for larger sample sizes. A representative confidence factor is given in equation (1) below:

$$\left[ 1 - \frac{1}{\sqrt{\#R}} \right] \quad \text{Eq. 1}$$

where $\#R$ is the number of samples (ratings)

Thus, the entire equation for the controversiality index can be given as follows:

$$\sigma \cdot \left( 1 - \frac{1}{\sqrt{\#R}} \right) \cdot K \quad \text{Eq. 2}$$

where: $\sigma$ is the standard deviation;

$\#R$ is the sample size;

$K$ is a constant such as 10,000.

Java software code for determining the controversiality index is given in FIG. 7. Statement 350 simply determines if there are enough rating scores to generate a meaningful understanding of the offering's controversiality. For something to be controversial, by definition, more than one person must express an opinion about it. Thus, if the number of review scores (sample_size) is less than or equal to 1, a score of 0 is returned, indicating that the item is not controversial.

Statement 352 calculates the mean (average) of a list of integers. Statement 354 calculates the standard deviation, commonly called "sigma." As integers become more widely dispersed from the mean, the standard deviation increases. For the five star rating system (1, 2, 3, 4, 5) the mean is 3 and the maximum standard deviation from the mean is 2 (all samples are 1 or 5). Statement 356 adjusts for "confidence" and converts the fractional expression of standard deviation to an integer. As noted above, the confidence factor is determined by equation (1), and the adjustment can be achieved by multiplying by 10,000. Note that the value of the confidence factor will always be less than 1. The larger the sample size, the closer the value will be to 1, and thus the resulting adjusted value will be only slightly smaller than the standard deviation. Stated in another way, for small sample sizes, there is less confidence that the calculated value is close to what would be obtained for the public at large, so the value of the controversiality index is reduced, rather than incorrectly indicating that an offering is highly controversial.

Figure 8:
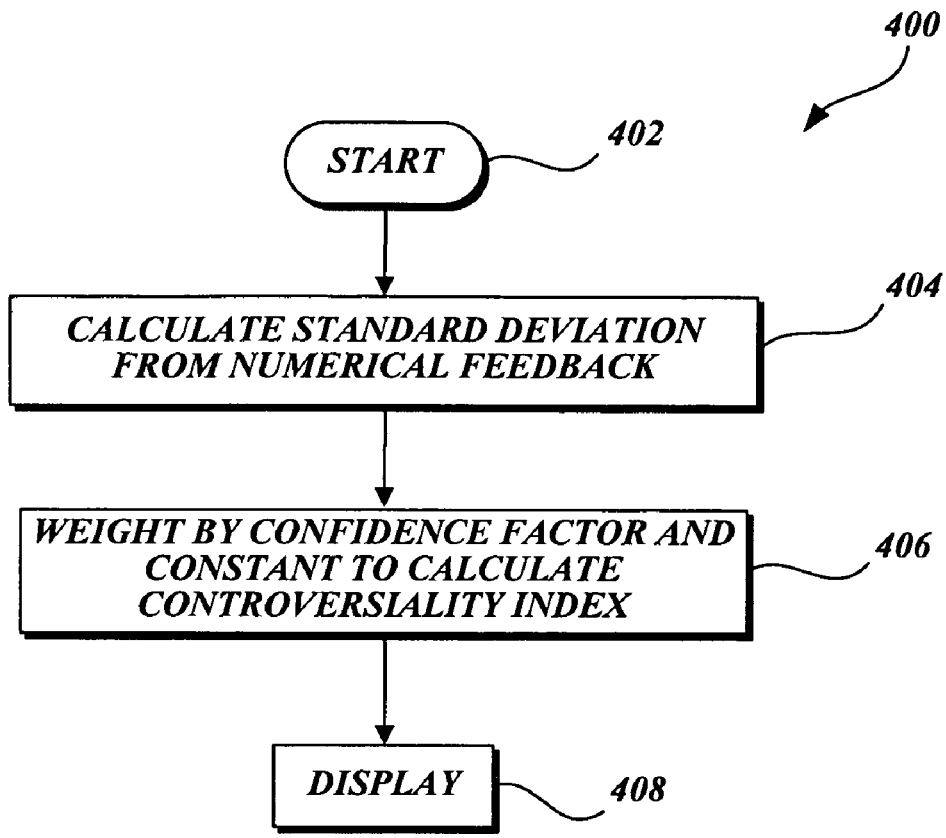
FIG. 8 is a flow chart of steps performed in the fourth embodiment of the present invention.

Referring to FIG. 8, flow chart 400, once it is determined that controversiality is to be determined ("start" 402), and the amount of feedback is sufficient for a calculation, a measure of negative feedback is determined by computing the standard deviation of the numerical data, as indicated at 404. As indicated at 406, the confidence factor based on transaction volume and the constant are used to adjust the standard deviation and arrive at the controversiality index. If desired, the degree of controversiality is displayed (408) to the consumer or merchant (content provider).

As for other types of customer rating information, the controversiality index can be presented based on user profile characteristics and historical data. Trends in an offering's controversiality index may be indicated in a chart or graph, or those offerings trending most toward or away from controversiality may be identified. Historical data also may be of interest, such as most controversial offerings of a certain time period, in addition to the information of current controversiality and trends. In addition to using a confidence factor based on the volume of ratings, other weighting factors can be used. For example, more recent ratings can be given greater weight than older ratings in arriving at the controversiality index displayed to a user or used by a merchant.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for expressing information concerning an offering in a computer system, which method comprises:
retrieving, by a computer, user feedback information from a computer memory containing information from a multitude of users indicating a reaction of each of the multitude of users to the offering, each reaction being classified on a scale ranging from negative to positive; and
evaluating the user feedback information to determine whether or not the offering is controversial, the evaluating step further comprising the steps of:
calculating, by the computer, a measure of relatively intense reactions to the offering from the reactions, a reaction being relatively intense when the reaction meets an intensity threshold on the scale;
calculating, by the computer, an average reaction to the offering from the reactions; and
determining, by the computer, a degree of controversiality for the offering from at least the measure of relatively intense reactions and the average reaction.

2. The method defined in claim 1, including encoding for rendering the degree of controversiality.

3. The method defined in claim 1, in which the degree of controversiality is within a predetermined numerical range.

4. The method defined in claim 3, including weighting the degree of controversiality by a confidence factor based on a measure of transaction volume for the offering.

5. The method defined in claim 1, wherein each reaction comprises a numerical rating, wherein the degree of controversiality is further determined from the standard deviation of the numerical ratings.

6. The method of claim 1, wherein a reaction classified within a midrange of the scale is neutral.

7. The method of claim 1, wherein the degree of controversiality for the offering is further determined from a measure of transaction volume pertaining to the offering.

8. The method of claim 1, wherein the intensity threshold is for negativity and the measure of relatively intense reactions determines relatively negative reactions, wherein the degree of controversiality is positively correlated with the measure of relatively intense reactions and a relatively positive average reaction.

9. The method of claim 1, wherein the intensity threshold is for positivity and the measure of relatively intense reactions determines relatively positive reactions, wherein the degree of controversiality is positively correlated with the measure of relatively intense reactions and a relatively negative average reaction.

10. The method of claim 1, wherein the intensity threshold is for negativity and the measure of relatively intense reactions determines relatively negative reactions, wherein the degree of controversiality is positively correlated with the measure of relatively intense reactions and a relatively high transaction volume associated with the offering.

11. The method of claim 10, wherein the offering comprises a product and the transaction volume comprises a sales volume associated with the product.

12. The method of claim 1, further comprising the step of determining, by the computer, that the offering is controversial when the degree of controversiality meets a threshold.

13. The method of claim 1, further comprising determining, by the computer, that the offering is controversial when the measure of relatively intense reactions meets a first threshold and the average reaction meets a second threshold.

14. A system for expressing information concerning an offering, which system comprises:
at least one processor;
a computer memory storing user feedback information from a multitude of users which feedback information represents a reaction of each of the multitude of users to the offering, each reaction being classified on a scale ranging from negative to positive; and
an application executable on the at least one processor, the application comprising:
logic that retrieves the user feedback information from the computer memory; and
logic that evaluates the user feedback information to determine whether or not the offering is controversial, logic that evaluates further comprising:
logic that calculates a measure of relatively intense reactions to the offering from the reactions, a reaction being relatively intense when the reaction meets an intensity threshold on the scale;
logic that calculates an average reaction to the offering from the reactions; and
logic that determines a degree of controversiality for the offering from at least the measure of relatively intense reactions and the average reaction.

15. The system defined in claim 14, wherein the application further comprises logic that encodes for rendering the degree of controversiality.

16. The system defined in claim 14, in which the degree of controversiality is within a predetermined numerical range.

17. The system defined in claim 16, wherein the application further comprises logic that weights the degree of controversiality by a confidence factor based on a measure of transaction volume for the offering.

18. The system defined in claim 14, wherein each reaction comprises a numerical rating, wherein the degree of controversiality is further determined from the standard deviation of the numerical ratings.

19. The system defined in claim 14, wherein a reaction classified within a midrange of the scale is neutral.

20. The system defined in claim 14, wherein the degree of controversiality for the offering is further determined from a measure of transaction volume pertaining to the offering.

21. The system defined in claim 14, wherein the intensity threshold is for negativity and the measure of relatively intense reactions determines relatively negative reactions, wherein the degree of controversiality is positively correlated with the measure of relatively intense reactions and a relatively positive average reaction.

22. The system defined in claim 14, wherein the intensity threshold is for positivity and the measure of relatively intense reactions determines relatively positive reactions, wherein the degree of controversiality is positively correlated with the measure of relatively intense reactions and a relatively negative average reaction.

23. The system defined in claim 14, wherein the intensity threshold is for negativity and the measure of relatively intense reactions determines relatively negative reactions, wherein the degree of controversiality is positively correlated with the measure of relatively intense reactions and a relatively high transaction volume associated with the offering.

24. The system of claim 23, wherein the offering comprises a product and the transaction volume comprises a sales volume associated with the product.

25. The system defined in claim 14, wherein the application further comprises logic that determines that the offering is controversial when the degree of controversiality meets a threshold.

26. The system defined in claim 14, wherein the application further comprises logic that determines that the offering is controversial when the measure of relatively intense reactions meets a first threshold and the average reaction meets a second threshold.

\* \* \* \* \*